United States Patent [19]
Dowdy et al.

[11] Patent Number: 5,920,880
[45] Date of Patent: Jul. 6, 1999

[54] METHOD AND SYSTEM FOR A DYNAMIC RENDERING PROTOCOL

[75] Inventors: Thomas E. Dowdy, Sunnyvale; Alexander B. Beaman, Cupertino, both of Calif.

[73] Assignee: Apple Computer, Inc., Cupertino, Calif.

[21] Appl. No.: 08/707,669

[22] Filed: Sep. 4, 1996

[51] Int. Cl.⁶ .................................................. G06H 15/00

[52] U.S. Cl. .......................... 707/523; 345/433; 395/110; 707/542

[58] Field of Search ............................. 345/433; 707/523, 707/542; 395/110

[56] References Cited

U.S. PATENT DOCUMENTS 5,671,345  9/1997  Lhotak ..................................... 345/433
5,708,828  1/1998  Coleman ................................. 707/523

*Primary Examiner*—Mark R. Powell
*Assistant Examiner*—Chanté E. Harrison
*Attorney, Agent, or Firm*—Sawyer & Associates

[57] ABSTRACT

The present invention includes a method of dynamic rendering protocol for display of glyphs used in a data processor comprising the steps of listing output image formats of font scalers which can be outputted to a graphics system and listing input image formats which can be inputted to a blitter function. These input image formats and output image formats are intersected, and an ordered list of the intersecting input image formats with output image formats are generated based upon a predetermined criteria. The first of the ordered list can then be selected for use.

20 Claims, 4 Drawing Sheets

METHOD AND SYSTEM FOR A DYNAMIC RENDERING PROTOCOL

FIELD OF THE INVENTION

The present invention relates generally to graphic generation and more particularly, the present invention relates to a dynamic rendering of glyphs on an output device.

BACKGROUND OF THE INVENTION

Current computer systems provide individuals with an opportunity to produce documents of professional quality, such as with desktop publishing software and graphics software programs. The ability to manipulate the appearance of the text within these programs is vital in allowing users greater flexibility in creativity in document production. Included in these manipulations are changes in fonts, justification, size, and other aspects of the appearance, such as bolding and italicizing.

For ease of understanding the subject matter, some definitions are herein presented. What is meant by text is words of something written or printed. What is meant by characters is abstract objects having a single and unique semantic or phonetic meaning. A glyph, as opposed to a character, is the visual, graphical appearance of a character. The particular representation of a character by a glyph is done in the context of the font, the font being a collection of glyphs which typically have an element of design consistency in their appearance.

A conventional system for rending glyphs typically uses codes known as blitters to facilitate rendering glyph-images to the screen. Blitters are typically very specialized code which can take simple input and copy and display that input onto the display device. Typically, blitters are used for a highly specialized purpose, such as rendering text to a display given a particular format of the image and characterizations of the display device. In order to accommodate the blitters, the font scaler inputs to the blitters need to be in the particular image formats which are accepted by the blitters.

A problem in the conventional glyph rendering system is the lack of adaptability to new image formats and fonts. The selections of the fonts and the image formats are completely fixed within the graphics system. The selections of the image formats are defined in the graphics system and no other fonts or formats can typically be supported. Accordingly, what is needed is a system and method for dynamically adapting new fonts and image formats which can be rendered to an output device such as a screen. The system and method should be easily implemented, cost effective and easily adaptable to existing glyph rendering systems. The present invention addresses such a need.

SUMMARY OF THE INVENTION

The present invention provides a system and method which allows new data types to be added by either the system maker, such as Apple Computer, Inc., or a third party. The present invention allows a user of the system to add additional data types, such as various font formats, which were not originally included in the system, by simply installing software related to a new font which the user may wish to use.

In a first aspect, the present invention is a method of providing a dynamic rendering protocol for display of glyphs used in a data processor which lists image formats that can be outputted by a font scaler and image formats which can be inputted to a blitter function. These input image formats and output images formats are intersected, and a list of the intersecting image formats are generated based upon a predetermined criteria.

In a second aspect, the present invention is a system for providing a dynamic rendering protocol for display of glyphs used in a data processor comprising at least one font scaler having output image formats which can be outputted. It also includes a plurality of blitter functions having input image formats which can be inputted to the blitter functions. A graphics system is coupled to the font scaler and the plurality of blitter functions. The graphics system receives the output image formats of the font scaler and intersects the input image formats with the output image formats. The graphics system also generates a list of the intersecting input image formats with output image formats based upon a predetermined criteria.

DETAILED DESCRIPTION OF THE INVENTION

The present invention relates to a dynamic rendering of glyphs on an output device. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention is preferably used with a system described in U.S. patent application Ser. No. 08/638,489, entitled "A METHOD AND SYSTEM FOR SUPPORTING MULTIPLE FONT FORMATS BY A FONT SCALER SUB-SYSTEM", filed Apr. 26, 1996 by Beaman et al., U.S. patent application Ser. No. 08/638,490, entitled "A METHOD AND SYSTEM FOR PROVIDING MULTIPLE GLYPHS AT A TIME FROM A FONT SCALER SUB-SYSTEM", filed Apr. 26, 1996 by Beaman et al., and U.S. patent application Ser. No. 08/630,864, entitled "A METHOD AND APPARATUS FOR TYPOGRAPHIC GLYPH CONSTRUCTION INCLUDING A GLYPH SERVER" filed Mar. 29,1996 by Beaman et al. All three patent applications are assigned to the assignee of the present application and are hereby incorporated by reference.

Figure 1:
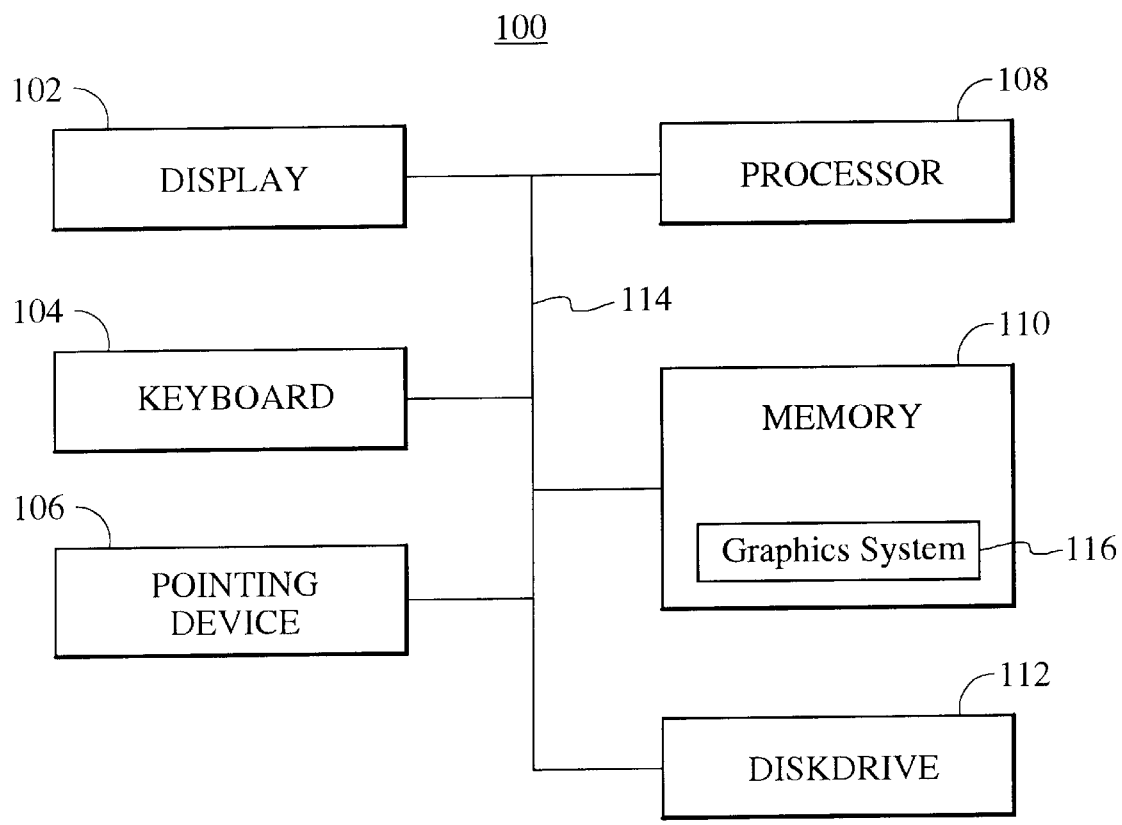
FIG. 1 is a data processing system in which the present invention can reside.

FIG. 1 is a block diagram illustrating a conventional computer system in which the present invention resides. The computer system 100 includes a display 102, a keyboard 104, a pointing device 106, a processor 108, a memory 110, and a disk drive 112, which are all connected by a bus 114. The graphics system 116 of the present invention resides in memory 110. The processor 108 operates in conjunction with the memory 110 to execute a graphics system 116 which can recall various font data more efficiently than the conventional graphics systems. In a preferred embodiment, the graphics system may be loaded onto the computer through the disk drive 112 or through a network connection.

Figure 2:
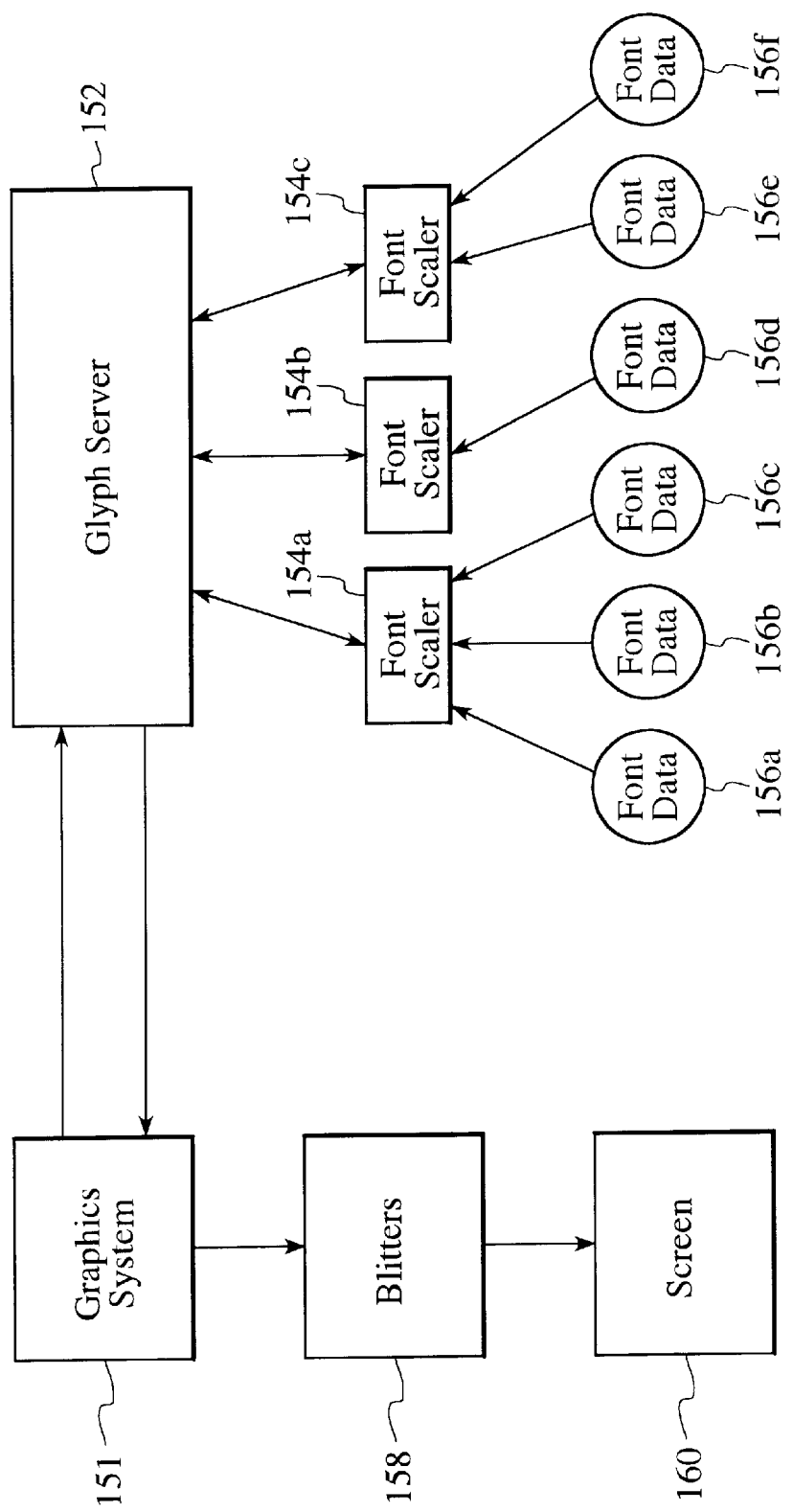
FIG. 2 is a flow diagram of a conventional glyph display method and system.

FIG. 2 shows a block diagram of a conventional system 150 for displaying glyphs on an output device such as screen 160. The system 150 includes a screen 160, blitters 158, a graphic system 151, a glyph server 152, and font scalers 154a–154c support a variety of font data 156a–156f. When a glyph is desired to be rendered on an output device such as screen 160, the graphics system 151 makes a request of the glyph server 152. In this example, the requested glyph can be from a particular font.

The glyph server 152 describes each requested glyph to be generated. A glyph server 152 can be a portable unit that is capable of interfacing with a variety of graphics systems 151. Instead of generating glyph data itself, the graphic system 151 requests glyphs from the glyph server 152, which then services the request.

The glyph server 152 then requests the desired glyph data from the font scaler 154a–154c. The font scaler 154a–154c then accesses the font data 156a–156f and derives a font derivation which satisfies the font request. The font derivation may be a derivation such as metrics, an outline of the font, a bitmap rendering of the font, a color of the font, or a compressed rendering of the font.

The font scaler 154 then delivers its output to the glyph server 152 which in turn caches it and sends the requested data to the graphics system 151. In rendering the glyph data onto the screen 160, the graphics system 151 utilizes code typically referred to as blitters 158. Blitters are typically very specialized code which can take simple input and copy and display that input onto the display device. The blitters 158 are designed to write glyph renderings in particular image formats to the screen 160.

In order to accommodate the format requirements of blitters 158, the glyph rendering data inputted into the blitters 158 must be in the image format of the blitters 158. The formats which are currently supported by the conventional system include bitmaps and the use of glyph outlines in the form of quadratics.

As previously discussed, a problem in the conventional system is the lack of adaptability to new image formats and fonts. The selections of the fonts and the image formats are substantially fixed within the graphics system. The selections of the formats are defined in the graphics system and no other fonts or formats can be supported. Accordingly, what is needed is a system and method for dynamically adapting new fonts and image formats which can be rendered to an output device such as a screen 160. The system and method should be easily implemented, cost effective and easily adaptable to existing glyph rendering systems. The present invention addresses such a need.

The present invention provides a system and method which allows new data types to be added by either the system maker, such as Apple Computer, Inc., or a third party. The present invention allows a user of the system to add on additional data types, such as various font formats, which were not originally included in the system, by simply installing software related to a new font format which the user may wish to use. To more particularly describe the features of the present invention, refer now to the following discussion in conjuction with FIGS. 3–4.

Figure 3:
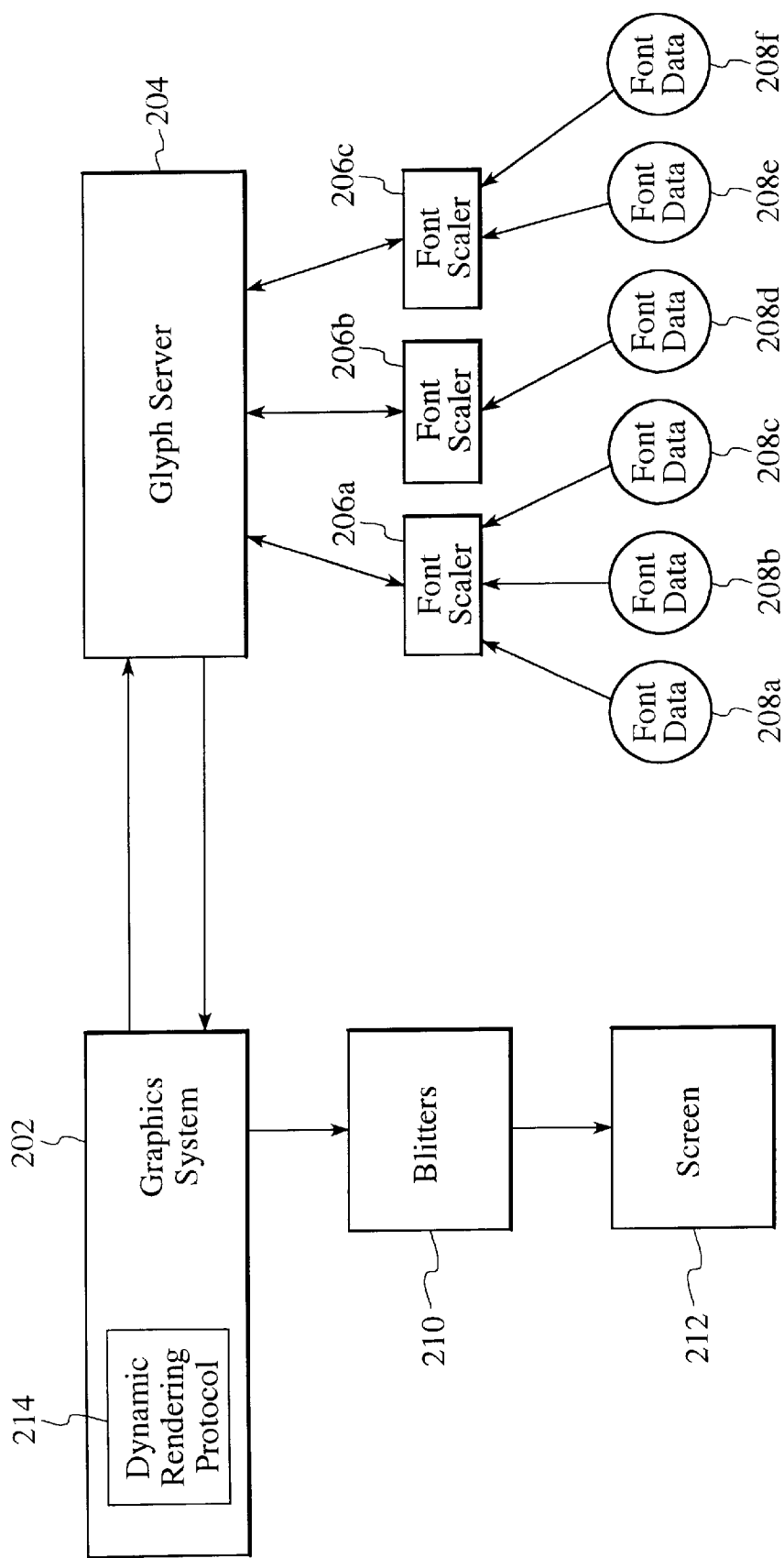
FIG. 3 is a block diagram of a dynamic rendering glyph display system according to the present invention.

FIG. 3 shows a glyph rendering system 200 according to the present invention. The system includes a screen 212, blitters 210, graphics system 202, glyph server 204, and font scalers 206a–206c which support a variety of font data 208a–208f. When a glyph from a particular font is desired to be rendered upon an output device such as the screen 212, the graphics system 202 makes a request of the glyph server 204. The glyph server in turn makes a request of the font scalers 206a–206c. The font scaler 206 uses the font data 208a–208f to derive the requested glyph data which is sent to the glyph server 204. The glyph server then sends the information to the graphics system 202 which utilizes the dynamic rendering protocol 214 within the graphics system 202 to render the particular image format. The dynamic rendering protocol 214 utilizes information regarding blitters 210 and information regarding the font scaler 206 output to produce the image.

Figure 4:
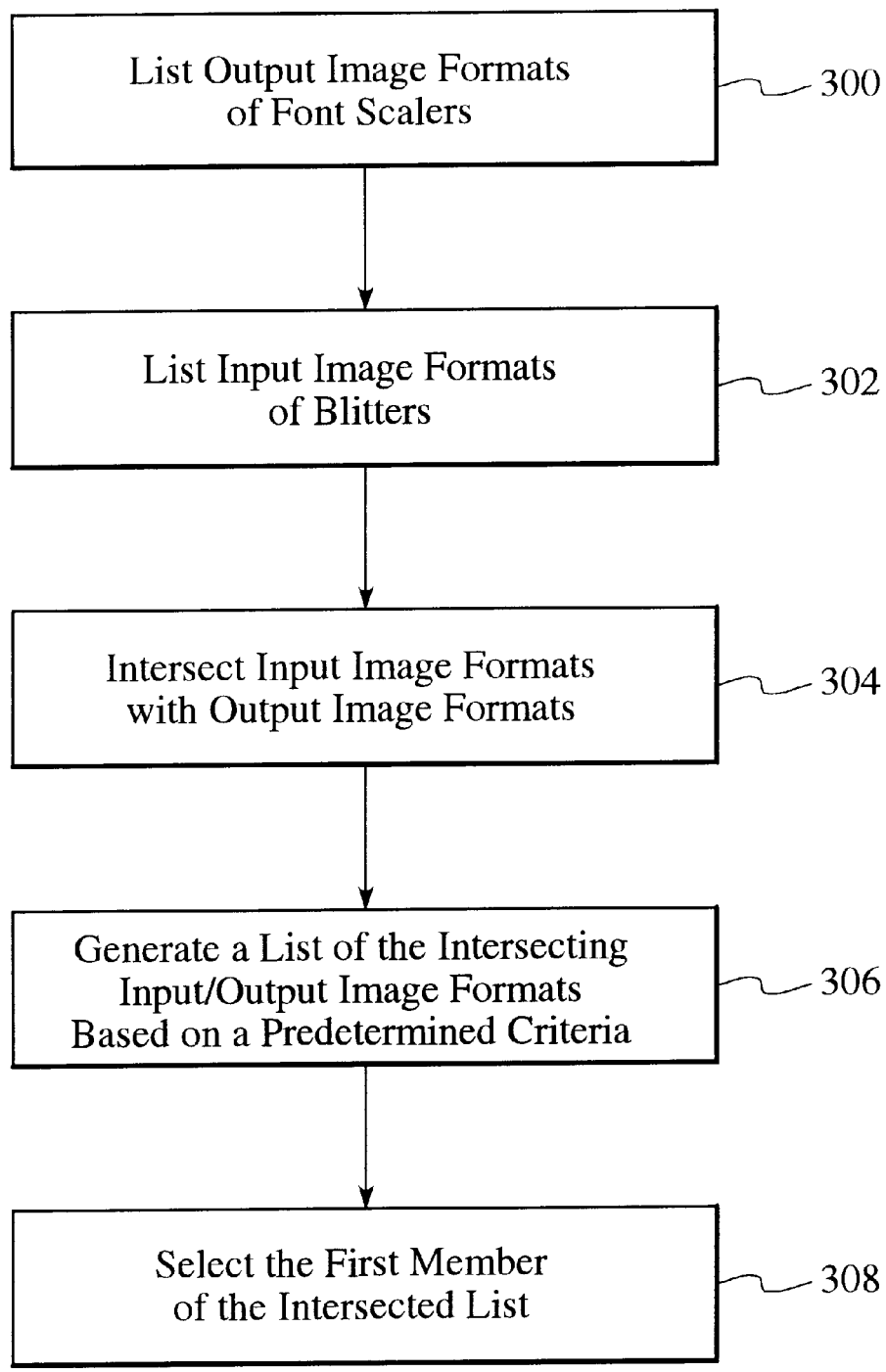
FIG. 4 is a flow diagram of a dynamic rendering glyph display method according to the present invention.

FIG. 4 shows a block diagram of the operation of the dynamic rendering protocol 214. A list of output image formats of the font scalers is generated via step 300. Examples of output image formats of font scalers not only include the standard bitmaps and outline of fonts in the form of quadratics, it may also include such output image formats as deep bitmaps, compressed bitmaps, and outlines in other formats such as cubics formats. Deep bitmaps may have color and appear to be three-dimensional through the use of shade. Compressed bitmaps may be used to store information efficiently.

A list of the input image formats of blitters is generated via step 302. For each new format, such as deep bitmaps, a blitter specifically designed for that format is provided in order to render the information onto an output device such as screen 212. The list of input image formats of blitters includes all types of inputs that the existing blitters can obtain.

An intersection of the input image formats with the output image formats is provided via step 304. This step assures that the system will not waste its resources on trying to render an output image format of a font scaler 206 when no supporting blitter exists. An example of intersection is the selection of one bit bitmaps given that the available input image formats is comprised of one bit bitmaps and the available output image formats is comprised of deep bitmaps and one bit bitmaps. Intersecting the input image format with the output image format also assures that every output image format of the font scaler within the intersection will have a supporting blitter 210 which will allow the particular format of the font to be rendered upon screen 212.

An ordered list of the intersection based upon a predetermined criteria is then generated via step 306. Predetermined criteria can include such criteria as information regarding hardware, options chosen by the application being utilized, and preferred formats of font scalers 206. Information regarding hardware can be information relating to performance or memory size the specific image formats might consume. An example of options chosen by the application can be a request to compress the data. Lastly, an example of preferred formats of font scaler 206 can be a form of cubics used whenever an outline is requested. Some font scalers may prefer to use cubics for an outline format, while other font scalers may prefer quadratics as an outline format. The preferred format does not preclude the font scaler 206 from producing a nonpreferred format, however, it may be easier for the font scaler 206 to produce its preferred format.

Once an ordered list of the intersection has been generated, the first member of the ordered list can be selected via step 308. In practice, any member of the ordered list may be selected, however, it is preferred to select the first member since it is assumed that the ordered list is typically a list of prioritized items.

Although the present invention has been described in accordance with the embodiments shown, one or ordinary skill in the art will readily recognize that there could be variations to the embodiments, and those variations would be within the spirit and scope of the present invention. Accordingly, many modifications may be made by one of ordinary skill in the art without departing from the spirit and scope of the appended claims.

What is claimed is:

1. A method for providing a dynamic rendering protocol for display of font scalers used in a data processor comprising the steps of:

(a) listing output image formats which can be provided to a graphics system by at least one font scaler;

(b) listing input image formats which can be provided to a plurality of blitter functions;

(c) intersecting the input image formats with the output image formats, wherein at least one blitter function supports the intersecting output image formats; and (d) generating an ordered list of the intersecting input formats with output formats based upon a predetermined criteria.

2. The method of claim 1, wherein the predetermined criteria is based on hardware information.

3. The method of claim 1, wherein the predetermined criteria is based on hardware performance.

4. The method of claim 1, wherein the predetermined criteria is based on size of memory required for a data format.

5. The method of claim 1, wherein the predetermined criteria is based on options chosen by an application.

6. The method of claim 1, wherein the predetermined criteria is based on the requirement of data compression.

7. The method of claim 1, wherein the predetermined criteria is based on preferred formats of at least one font scaler.

8. The method of claim 1, wherein a first member of the ordered list is selected.

9. A system of dynamic rendering protocol for display of font scalers used in a data processor comprising:

at least one font scaler having output image formats;

a plurality of blitter functions having input image formats of the at least one font scaler which can be inputted to the blitter functions;

a graphics system coupled to the font scaler and the plurality of blitter functions, the graphics system receiving the output image formats of the font scaler; the graphics system intersecting the input image formats with the output image formats, wherein at least one blitter function supports the intersecting output image formats, and generating an ordered list of the intersecting input image formats with output image formats based upon a predetermined criteria.

10. The system of claim 9, further comprising a glyph server coupled to the graphics system and the font scaler, the glyph server receiving requests from the graphics system and describing the request to the font scaler.

11. A system of dynamic rendering protocol for display of glyphs used in a data processing comprising:

means for generating glyph renderings having output image formats of at least one font scaler;

means for facilitating display of glyphs, the facilitating means having input image formats which can be inputted to a plurality of blitter functions;

means for coordinating graphics for display coupled to the generating means and the facilitating means, the coordinating means intersecting the input image formats with the output image formats, wherein at least one blitter function supports the intersecting output image formats, and generating an ordered list of the intersecting input image formats with output image formats based upon a predetermined criteria.

12. The system of claim 11, further comprising a glyph server coupled to the graphics system and the font scaler, the glyph server receiving requests from the graphics system and describing the request to the font scaler.

13. A computer-readable medium containing program instructions for dynamic rendering protocol for display of glyphs used in a data processor comprising the steps of:

(a) listing output image formats which can be outputted to a graphics system by at least one font scaler;

(b) listing input image formats which can be inputted to a plurality of blitter functions;

(c) intersecting the input image formats with the output image formats, wherein at least one blitter function supports the intersecting output image formats; and (d) generating an ordered list of the intersecting input image formats with output image formats based upon a predetermined criteria.

14. The computer-readable medium containing program instructions claim 13, wherein the predetermined criteria is based on hardware information.

15. The computer-readable medium containing program instructions claim 13, wherein the predetermined criteria is based on hardware performance.

16. The computer-readable medium containing program instructions claim 13, wherein the predetermined criteria is based on size of memory required for a data format.

17. The computer-readable medium containing program instructions claim 13, wherein the predetermined criteria is based on options chosen by an application.

18. The computer-readable medium containing program instructions claim 13, wherein the predetermined criteria is based on the requirement of data compression.

19. The computer-readable medium containing program instructions claim 13, wherein the predetermined criteria is based on preferred formats of the font scaler.

20. The computer-readable medium containing program instructions of claim 13, wherein a first member of the ordered list is selected.

* * * * *